G. M. STATES.
SELF FEEDER FOR THRESHING MACHINES.
APPLICATION FILED JUNE 24, 1916.
1,220,901.
Patented Mar. 27, 1917.
3 SHEETS—SHEET 1.
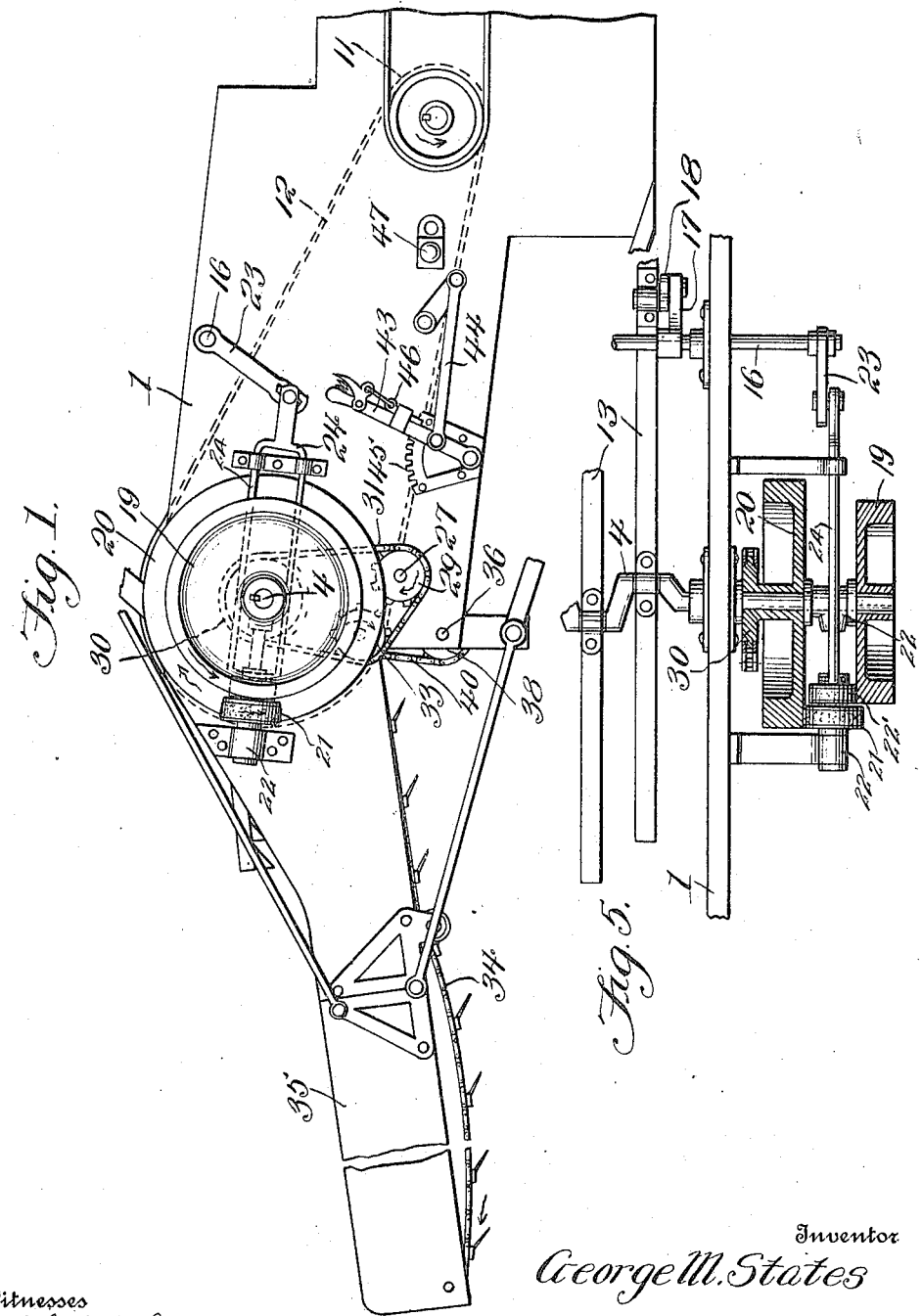
Witnesses
J. T. L. Wright
L. C. Wilcox
Inventor
George M. States
By Victor J. Evans.
Attorney G. M. STATES.
SELF FEEDER FOR THRESHING MACHINES.
APPLICATION FILED JUNE 24, 1916.
1,220,901.
Patented Mar. 27, 1917.
3 SHEETS—SHEET 2.
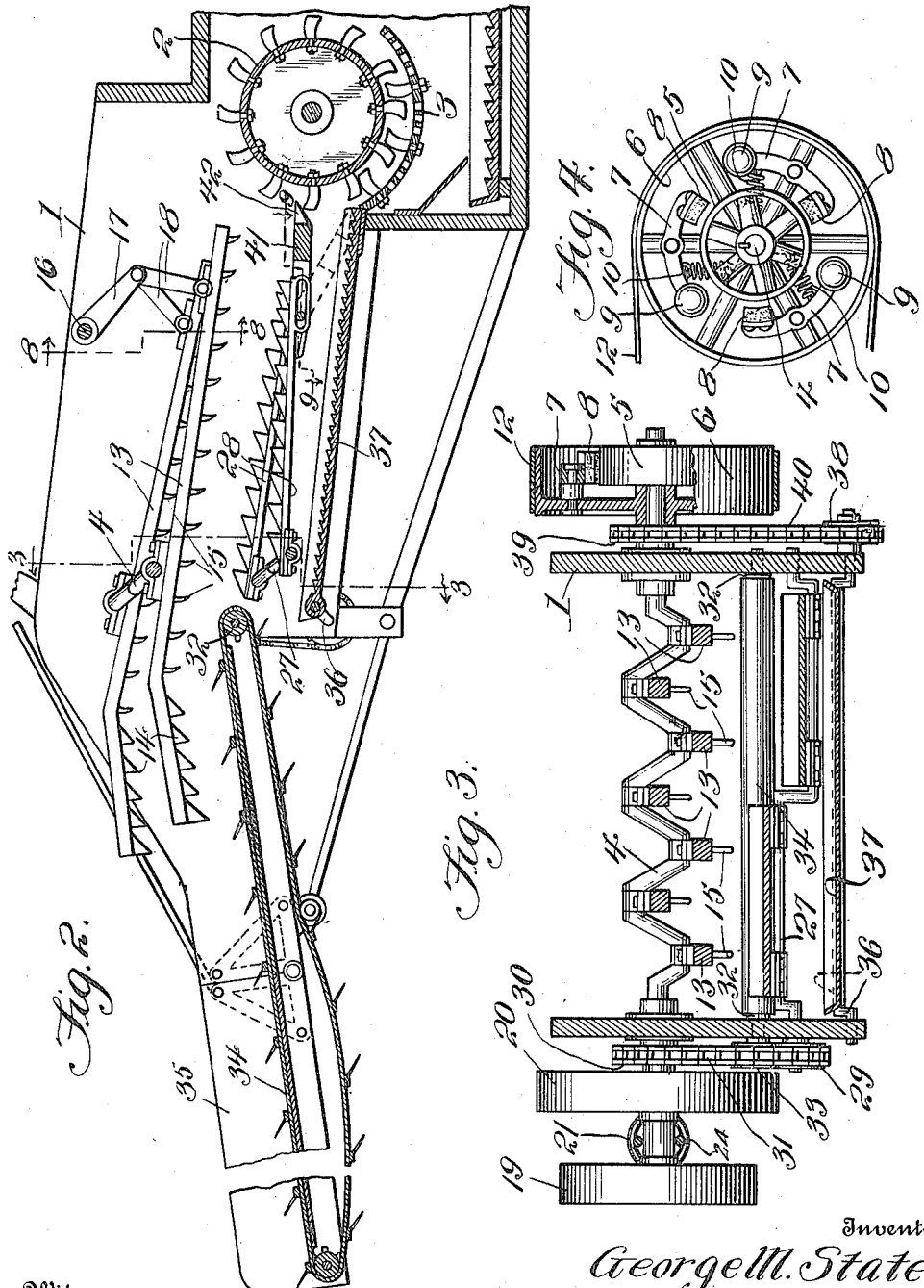
Witnesses
J. T. L. Wright
L. C. Wilcox
Inventor
George M. States
By Victor J. Evans
Attorney

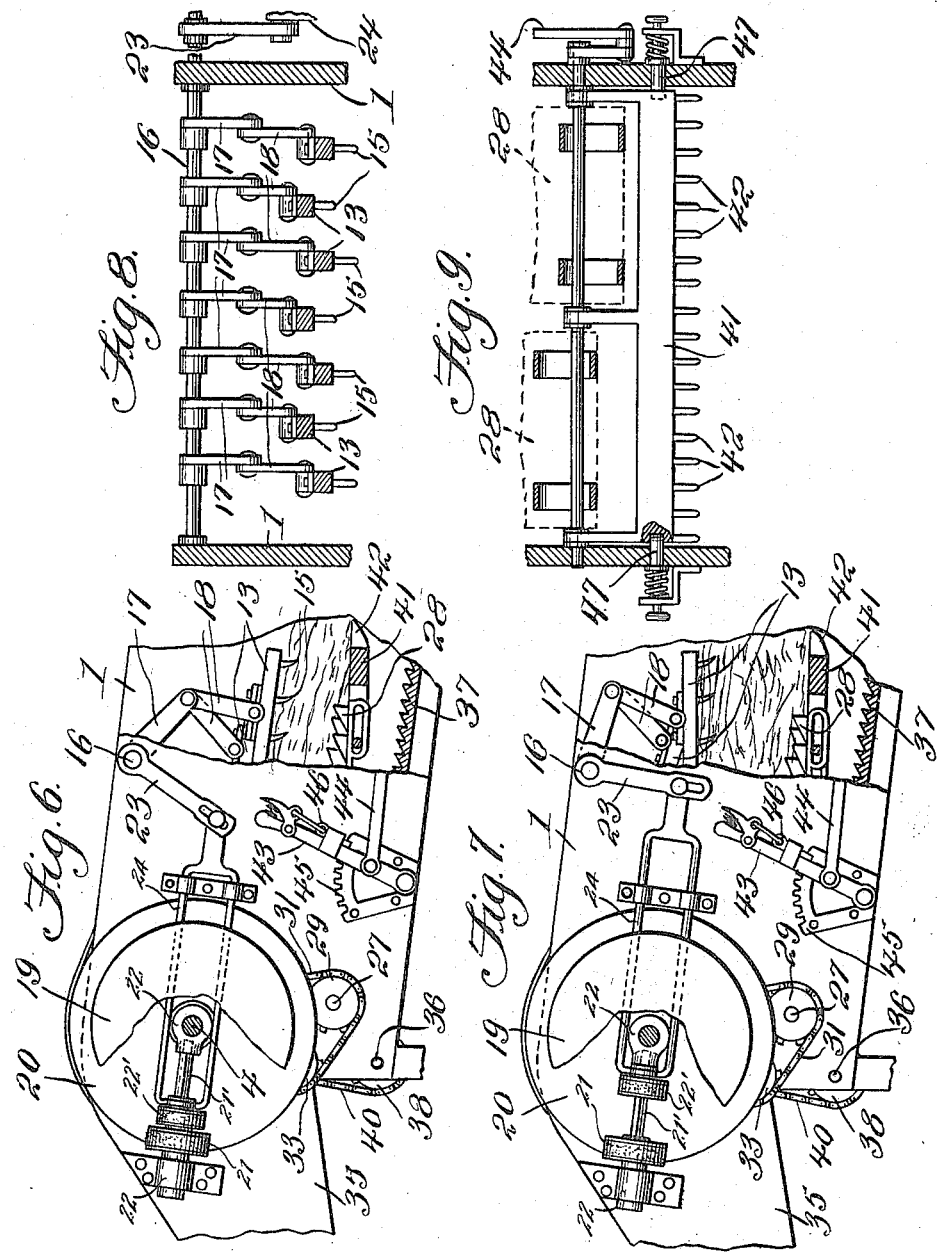

UNITED STATES PATENT OFFICE.

GEORGE M. STATES, OF DES MOINES, IOWA.

SELF-FEEDER FOR THRESHING-MACHINES.

1,220,901. Specification of Letters Patent. Patented Mar. 27, 1917.

Application filed June 24, 1916. Serial No. 105,650.

*To all whom it may concern:*

Be it known that I, GEORGE M. STATES, a citizen of the United States, residing at Des Moines, in the county of Polk and State of Iowa, have invented new and useful Improvements in Self-Feeders for Threshing-Machines, of which the following is a specification.

This invention relates to self feeders for threshing machines and it consists in the novel features hereinafter described and claimed.

An object of the invention is to provide a self feeder with means for regulating the quantity or amount of grain which will pass over the same to the cylinder of a threshing machine.

With the above object in view the structure includes an upper and a lower set of feeding rakes mounted for reciprocatory movement, there being means provided for moving the said rakes, the said means also operating the belt which feeds the grain to the rakes. The rakes are so arranged and operated that when an excessive quantity of grain is between the lower and upper rakes and is liable to choke the cylinder of the threshing machine the upper set of rakes are swung upon their mountings whereby they coöperate with means which transmit the movement to the lower rakes for causing the lower rakes to move at a slower rate of speed thus preventing the excessive quantity of grain from being presented to the threshing cylinder and choking the same. Inasmuch as the feeding belt is operated with the lower set of rakes as the feeding movement of the lower set of rakes is slackened the said feeding belt is caused to move at a slower rate of speed and thus the grain is delivered between the rakes in relatively small quantities until such time as the excessive quantity of grain between the rakes is reduced when the upper rakes swing in a downward direction upon their mountings and the lower rakes and the feeding belt assume their normal rates of speed with relation to the movement of the upper set of rakes. A retarder is pivotally mounted at the lower edge of the lower set of rakes and is operatively connected with a lever mechanism whereby the said retarder may be positioned at a desired angle with relation to a horizontal and with relation to the periphery of the threshing cylinder. When the said retarder is placed at its normal position it is sustained by spring pressed bolts thereby relieving the lever and the connection between the lever and the retarder of strain. A grain pan is mounted for reciprocation below the lower set of rakes and suitable means is provided for moving the grain pan in a usual manner. The feeding mechanism is operated from the shaft of the cylinder by a belt but there is positioned upon the driving or crank shaft of the feeding device a governor mechanism which permits the said feeding device to remain at a state of rest until such time as the threshing cylinder assumes a proper speed for properly performing its function in the threshing operation. At this time the said governor mechanism comes into play and operatively connects the feeding mechanism with the cylinder shaft whereby the parts may operate in unison.

In the accompanying drawings:—

Figure 1 is a side elevation of the feeder.

Fig. 2 is a longitudinal sectional view of the same.

Fig. 3 is a transverse sectional view of the same cut on the line 3—3 of Fig. 2.

Fig. 4 is a detailed side view of parts of the same.

Fig. 5 is a fragmentary horizontal sectional view.

Fig. 6 is a fragmentary side view showing the parts in one position.

Fig. 7 is a similar view showing the parts in another position.

Figs. 8 and 9 are sections cut on the lines 8—8 and 9—9 of Fig. 2.

The thresher to which the feeder is applied includes the usual casing 1 in which a cylinder 2 is journaled for rotation and below which is located the usual concave 3. A crank shaft 4 is journaled for rotation in the casing 1 and is provided at one end with a pulley 5. A wheel 6 is loosely journaled upon the shaft 4 and is provided upon some of its spokes with pivoted arms 7 carrying at one end shoes 8 adapted at times to engage the periphery of the pulley 3 and provided at the opposite ends with weights 9 adapted to be thrown in an outward direction by centrifugal force when the wheel 6 is rotated at a predetermined rate of speed. Springs 10 are connected at one end with the end portions of the arms 7 which carry the weights 9 and at their other ends with adjacent spokes of the wheel 6. The said springs are under tension with a tendency to hold the weighted ends of the arms 7 toward those spokes with which the said springs are attached. A pulley 11 is mounted upon the shaft of the cylinder 2 and a belt 12 is trained around the pulley 11 and the wheel 6. The shaft 4 hereinbefore mentioned is referred to hereinafter as the driving shaft of the feeder.

Any suitable means may be provided as usual for rotating the cylinder 2 and it will be seen that when the cylinder 2 is rotated at a proper rate of speed to perform its function in carrying the grain initially before it enters the thresher the belt 11 transmits movement from the cylinder 2 to the wheel 6 whereby the same is rotated at a rate of speed to cause the weighted ends of the arms 7 to move in an outward direction under centrifugal force whereby the shoes 8 are brought into frictional contact with the periphery of the pulley 5 and the shaft 4 is thereby rotated.

When the shaft 4 is rotated it operates the parts of the feeder as hereinafter explained.

From the foregoing it will be seen that the feeder remains at a state of rest until the operating parts of the thresher assume proper speed to properly accomplish the threshing operation and at this time the said feeder is automatically put into action by the frictional contact of the shoes 8 with the periphery of the pulley 5 which is fixedly mounted upon the shaft 4.

Upper feeder rake bars are pivoted upon the cranks of the shaft 4 and the said bars may be of any desired number. The bars 13 carry at their outer ends band cutting knives or blades 14 and the said bars are provided at their under sides with downwardly disposed teeth 15. The bars 13 may be constructed from any suitable material as for instance hard wood and the teeth may be of metal if desired.

A shaft 16 is turnably mounted in the casing 1 above the shaft 4 and at a point between the shaft 4 and the cylinder 2. The said shaft 16 is provided at one side with a series of fixed arms 17 which are connected by means of links 18 with the upper feed rake bars 13.

Therefore it will be seen that as the shaft 4 rotates the cranks thereof will reciprocate the rake bars 13 back and forth and the teeth 15 at the undersides thereof will engage the grain and remove the same toward the cylinder 2 and concave 3. At the same time the knives or blades 14 will encounter the bundles as they are presented to the feed bars and cut the bands thereof.

A disk 19 is fixed to one end of the shaft 4 beyond the side of the casing 1 and a disk 20 is loosely journaled upon the said shaft 4. A wheel 21 is located adjacent the disk 20 and has frictional contact with the same. The wheel 21 is fixed upon a shaft 21' which is journaled in bearings 22 one of which is mounted on the shaft 4. A wheel 22' is splined on the shaft 21' and has frictional contact with the disk 19. A yoke 24 is connected at one end with the wheel 22' and at its other end with an arm 23 fixed to the shaft 16.

A crank shaft 27 is journaled in the casing 1 below the shaft 4 and lower feed rakes 28 are pivoted upon the crank of the said shaft 27. The inner ends of the rakes 28 are supported in the casing 1 in any suitable or usual manner. A sprocket wheel 29 is fixed to one end of the shaft 27 and a sprocket wheel 30 is fixed to the side of the disk 20. A sprocket chain 31 is trained around the sprocket wheels 29 and 30 and is adapted to transmit rotary movement from the disk 20 to the shaft 27. A roller 32 is journaled in the casing 1 at a point between the shafts 4 and 27 and the shaft of the roller 32 is provided at one end with a sprocket wheel 33 which engages one run of the belt 31 in a manner to rotate the roller 32 when the said belt moves around the sprocket wheels 29 and 30. A feed belt 34 is trained around the roller 32 and is mounted for movement along a trough 35 in the usual manner. A crank shaft 36 is journaled for rotation in the casing 1 at a point below the shaft 27 and a grain pan 37 is mounted upon the crank of the said shaft 36 and the said pan is disposed in an inclined position below the lower feed rake bars 28 and its delivery end is in the vicinity of the concave 3. A sprocket wheel 38 is fixed to one end of the shaft 36 and a sprocket wheel 39 is fixed to the shaft 4 adjacent the pulley 5 mounted thereon. A sprocket chain 40 is trained around the sprocket wheels 38 and 39 and is adapted to transmit rotary movement from the shaft 4 to the shaft 36 whereby the grain pan 37 is reciprocated as the shaft 4 rotates.

A retarder 41 is pivotally mounted in the casing 1 at the lower inner ends of the rake bars 28 and the said retarder 41 is provided at its free edge with teeth 42 which may enter the spaces between the teeth carried by the cylinder 2 as the said cylinder rotates.

A lever 43 is fulcrumed upon the casing 1 and a rod 44 is pivotally connected at one end with the said lever and pivotally connected at its other end with the retarder 41. A dentate segment 45 is mounted upon the casing 1 adjacent the lever 43 and the said lever carries a spring pressed pawl 46 which is adapted to engage the teeth of the segment 45 whereby the said lever is held at an adjusted position. It will be understood that by swinging the lever 43 the rod 44 is moved longitudinally and the retarder 41 is swung upon its pivotal connection with the casing 1 whereby the said retarder may be positioned at a desired incline or angle with relation to a horizontal and with relation to the periphery of the cylinder 2. Spring pressed bolts 47 are located in the sides of the casing 1 and when the said retarder is moved to its uppermost or normal position the springs of the said bolts actuate the same whereby the inner ends of the bolts are moved under the ends of the retarder and the said retarder is supported at its elevated or normal position and any weight to which it is subjected is not thereby transmitted through the rod 44 and lever 46 and the parts mounted therein inasmuch as the said spring pressed bolts will sustain the weight of the retarder and the material which is passing over the same. When it is desired to swing the retarder 41 to a lower position the bolts 47 are manually withdrawn from under the same.

The operation of the feeder is as follows:—After the cylinder 2 has assumed a proper rate of speed to perform its function in the threshing operation the shaft 4 is rotated as hereinbefore described and the upper rake bars are reciprocated back and forth in the casing. Inasmuch as the wheel 21 has frictional contact with the disk 20 rotary movement is transmitted through the wheel 21' from the disk 19 to the disk 20. The disk 20 is rotated in an opposite direction from that in which the disk 19 is rotated. Through the sprocket wheel 30 which it attached to the side of the disk 20 and the chain 31 rotary movement is transmitted through the feeder roller 32 and to the shaft 27. Thus the lower rake bars 28 are reciprocated and the feeder belt 34 is moved along the trough 35. At the same time rotary movement is transmitted from the shaft 4 through the chain 40 to the shaft 36 whereby the grain pan 37 is reciprocated. The retarder 41 may be disposed at any desired angle as the conditions may require.

The grain is deposited upon the upper run of the belt 34 and is carried thereby between the rakes 13 and 28. As the bundles approach the knives or blades 14 the bands thereof are severed and the grain passes in a loose condition between the upper and lower sets of rakes. In the event that the quantity of grain between the upper set of rakes 13 and the lower set of rakes 28 becomes excessive the upper set of rakes are lifted whereby the links 18 are moved vertically and through the connecting arms 17 the shaft 16 is partially rotated. This swings the arm 23 which in turn moves the yoke 24 longitudinally and the wheel 22' is moved toward the center of the disk 19. Inasmuch as the disk 20 is rotated from the disk 19 as hereinbefore described when the wheel 22' is moved toward the central portion of the said disk the disk 20 is rotated at a slower rate of speed than when the said wheel 22' is in the vicinity of the periphery of the said disk 19. Thus the lower feeder bars 28 are caused to reciprocate at a lower rate of speed and the bulk or excessive amount of grain is not immediately forced toward the cylinder 2 but is fed gradually whereby the said grain is prevented from choking the cylinder and interfering with the operation of the same. Inasmuch as the feeder belt 34 is operated by the chain 31 when the said chain is caused to move at a slower rate of speed the grain is fed at a slower rate of speed by the belt 34 between the lower and upper sets of rakes and thus congestion of the grain between the upper and lower sets of rakes is prevented.

The structure and arrangement of the retarder 41 is such that in the event that the threshing machine is operated by an explosive engine and should the said engine assume a dead center and back fire and cause the cylinder 2 to rotate in a direction opposite to that in which it should rotate during the threshing operation the said retarder will not choke or wedge with the grain against the periphery of the cylinder 2 and cause damage to the thresher or the feeder. Any grain which should fall through the spaces between the lower feed rakes 28 upon the grain pan 37 is gradually worked down by gravity and the movement of the said pan into the concave 3 and from the said concave it passes into the body of the thresher in the usual manner.

From the foregoing description taken in conjunction with the accompanying drawings it will be seen that a feeder for a threshing machine of simple and durable structure is provided and that the parts mutually and automatically coöperate with each other to prevent an excessive amount of grain from being supplied suddenly to the cylinder of the threshing machine thereby choking and possibly damaging the same. Furthermore means are provided for permitting the feeder to remain at a state of rest until the parts of the thresher are operated at the proper rate of speed to properly accomplish the threshing operation. When the parts of the thresher are moving at the proper predetermined rate of speed the feeder is automatically put into action and the feeding of the grain takes place when the thresher is in a condition to receive the same.

Having described the invention what is claimed is:—

A feeder comprising upper feeder bars, a crank shaft for reciprocating said upper feeder bars, a disk mounted upon the crank shaft, lower feeder bars, a crank shaft for reciprocating the lower feeder bars, a disk loosely mounted upon the first mentioned crank shaft, means operatively connecting the last mentioned disks with the crank shaft which operates the lower feeder bars, a wheel located between the said disks and having frictional contact with the same and means operatively connecting the said wheel with the upper feeder bars to move the wheel with relation to the center of the disks as the upper feeder bars raise or lower.

In testimony whereof I affix my signature in presence of two witnesses.

GEORGE M. STATES.

Witnesses:
HAL DE HOSKINSON,
JOSHUA JESTER.